United States Patent Office 2,789,986
Patented Apr. 23, 1957

2,789,986

COUMARIN DERIVATIVES

Zelimir Procházka, Prague, Czechoslovakia, assignor to Spofa, narodni podnik, Prague, Czechoslovakia, a corporation of Czechoslovakia No Drawing. Application August 11, 1954,
Serial No. 449,260

3 Claims. (Cl. 260—343.2)

This invention relates to a method of preparing coumarin derivatives.

Compounds capable of lowering the prothrombin level of blood can be utilized practically in two important ways. They possess an anticoagulant property so that they may be used in human therapy, and, in addition, they are effective raticides if their anticoagulant action is accompanied by a selective toxicity against rat.

It has been established in systematic biological research work that among many coumarin compounds the derivatives of 4-hydroxycoumarin, which possess in the 3-position a comparatively large, low polar and low hydrophilic substituent, are particularly effective. The efficiency of such substances increases further if there is a carbonyl group in said substituent, for instance, a ketonic group on the gamma-carbon atom (see Formula II further below).

The present invention has as its object a new method of preparing coumarin derivatives which may be used either as such or as intermediates for the synthesis of other biologically active substances. Other objects will appear from the following description.

According to this invention, 3-derivatives of 4-hydroxycoumarin, having the formula

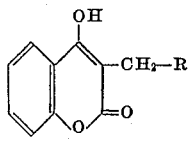

wherein R stands for an aliphatic or cyclic amine radical, are reacted at an increased temperature with a ketone, the latter having at least one hydrogen atom in the alpha-position to the ketonic group.

3-aminomethyl derivatives of 4-hydroxycoumarin, used in accordance with my invention, may be prepared in a known manner. Reference is made, for instance, to D. N. Robertson and K. P. Link, J. A. C. S. 75, 1883 (1953); or Z. Procházka, Chem. Listy, 47, 59 (1953).

The reaction takes place according to the following equation:

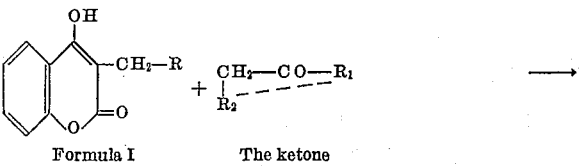

Formula I    The ketone

Formula II

In Formula I, R is $-N(CH_3)_2$ or

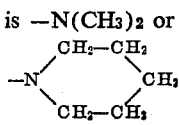

In the ketone formula and in Formula II, $R_1$ is a hydrocarbon radical, and $R_2$ is either hydrogen or a hydrocarbon radical, whereby $R_1$ and $R_2$ may form fused rings.

As starting material, 3-aminomethyl derivatives of 4-hydroxycoumarin, for instance, 3-dimethylaminomethyl - 4 - hydroxycoumarin, 3 - piperidinomethyl-4-hydroxycoumarin, and similar compounds may be used to advantage. Such compounds are heated at an increased temperature, for instance, 130–200° C., together with a suitable ketone having at least one hydrogen atom in the alpha-position to the carbonyl. During heating, the respective amine is split off, for example, dimethyl amine or piperidine, as will be clear from the above examples. The amine escapes readily from the reaction mixture, and the rest of the molecule reacts immediately with the carbon atom in the neighborhood of the ketonic group. The optimum average temperature for the reactions of the invention is about 165° C. The optimum average time of reaction is about 10 to 15 minutes, depending on the ketone used.

The product is isolated by pouring the reaction mixture into a diluted solution of an alkaline hydroxide, extracting the mixture with organic solvents, and precipitating the aqueous liquid with an acid.

The ketonic component may be aliphatic, alicyclic, or aromatic, nonsubstituted or substituted, for instance, cyclohexanone, decalone, tetralone, acetophenone, p-halogen acetophenone, propiophenone, etc. $\alpha,\beta$-unsaturated ketones may be used as well, such as chalcones, chromones, naphthoquinones, etc., which react in the same way.

EXAMPLE 1

*3-(o-hydroxybenzoyl ethyl)-4-hydroxycoumarin*

5 grams of 3-dimethylaminomethyl-4-hydroxycoumarin were mixed with 8 cc. of o-hydroxyacetophenone. The mixture was heated through ten minutes to 160° C. The temperature rose during two minutes up to 170° C. The mixture was then poured into 200 cc. of sodium hydroxide solution of 5 percent strength. The solution obtained was extracted by shaking it with ether, and the layer of water was neutralized to pH 7 with diluted hydrochloric acid. Then, the solution was extracted once more with ether, and the layer of water was acidified by adding hydrochloric acid to a pH of 3. The precipitate thus formed was filtered off and dried. The yield was 44% of the theoretical amount. After repeated recrystallization from acetic acid and acetone, the product melted at 193–195° C.

EXAMPLE 2

*3-benzoylethyl-4-hydroxycourmarin*

3 grams of 3-dimethylaminomethyl-4-hydroxycoumarin were heated with 4 cc. of acetophenone through 6 minutes up to 160–170° C. The mixture was poured into 100 cc. of sodium hydroxide solution, 5%. After extraction by shaking it with ether, the solution was acidified with hydrochloric acid, using Congo red as indicator. The precipitate was filtered off and dried. The yield amounted to 77%. After recrystallization from acetone, the product melted at 155° C.

EXAMPLE 3

*3-(2'-oxocyclohexyl-methyl)-4-hydroxycourmarin*

One gram of 3-dimethylaminomethyl-4-hydroxycoumarin was mixed with 2 cc. of cyclohexanone and heated to 160° C. for a period of 10 minutes. The temperature rose to 170° C. It was continued as in Example 2. The product has a melting point of 192° C.

EXAMPLE 4

*3 - chromonyl - 3 - methyl - 4 - hydroxycourmarin, i. e. (chromonyl-3)-(4-hydroxycoumarinyl-3)-methan*

Two grams of dimethylaminomethyl-4-hydroxycoumarin were mixed with one gram of chromone and heated 20 minutes to 170–190° C. The cooled reaction mixture was comminuted and recrystallized from acetic acid. The product has a melting point of 245° C. and was obtained in a yield of 80–90% of the theoretical amount.

It is believed that my invention, as well as the advantages thereof, will be apparent from the foregoing detailed description. It will also be apparent that while I have shown and described a few examples only of my invention, changes may be made without departing from the spirit of the invention, as sought to be defined in the following claims.

I claim:

1. Method of preparing coumarin derivatives, comprising reacting at increased temperature a substituted 3-aminomethyl-4-hydroxycoumarin of the formula

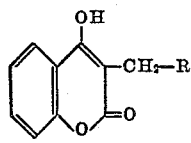

wherein R is selected from the group consisting of a lower dialkyl amine and piperidine radical, with a ketone having at least one hydrogen atom in $\alpha$-position to the ketonic group.

2. In the method according to claim 1, said reaction being carried out with a ketone selected from the group consisting of o - hydroxyacetophenone, p - chloroacetophenone, acetophenone, cyclohexanone, tetralone, decalone, propiophenone, chromone, naphthoquinone, and chalcone.

3. Chromonyl-3-(4-hydroxycoumarinyl-3)-methane.

References Cited in the file of this patent
UNITED STATES PATENTS 2,427,578    Stahmann _____ Sept. 16, 1947